United States Patent [19]

Hirosawa

[11] Patent Number: 4,547,814
[45] Date of Patent: Oct. 15, 1985

[54] METHOD OF RECORDING A HALFTONE PICTURE ELECTRONICALLY

[75] Inventor: Makoto Hirosawa, Kyoto, Japan

[73] Assignee: Dainippon Screen Seizo Kabushiki Kaisha, Kyoto, Japan

[21] Appl. No.: 438,026

[22] Filed: Dec. 6, 1982

[51] Int. Cl.$^4$ .............................................. H04N 1/22
[52] U.S. Cl. .................................... 358/298; 358/75; 358/283; 358/302
[58] Field of Search .................. 358/75, 78, 283, 298, 358/299, 300, 302; 346/107 R, 160, 108

[56] References Cited

U.S. PATENT DOCUMENTS 4,486,788  12/1984  Yamada ............................... 358/298

Primary Examiner—Thomas H. Tarcza
Attorney, Agent, or Firm—Zarley, McKee, Thomte, Voorhees & Sease

[57] ABSTRACT

A method for recording a halftone picture electronically, for use in a halftone picture reproducing machine for plate making is disclosed. A plurality of halftone data corresponding to a plurality of picture elements of a vignette halftone dot is simultaneously read out of a memory in which the vignette halftone dot quantized is stored, in synchronization with picture signals, and the halftone data and the picture signals are added to obtain recording signals, and according to the recording signals a plurality of light beams for exposure are controlled to be open or close, thereby recording a halftone picture. The number of the light beams included in a recording scanning width is selected depending on a screen pitch, and then the selected light beams are controlled according to the recording signals.

2 Claims, 12 Drawing Figures

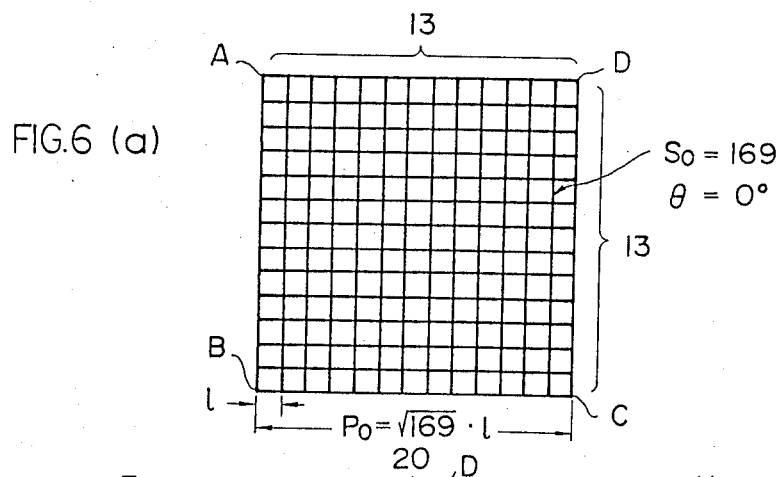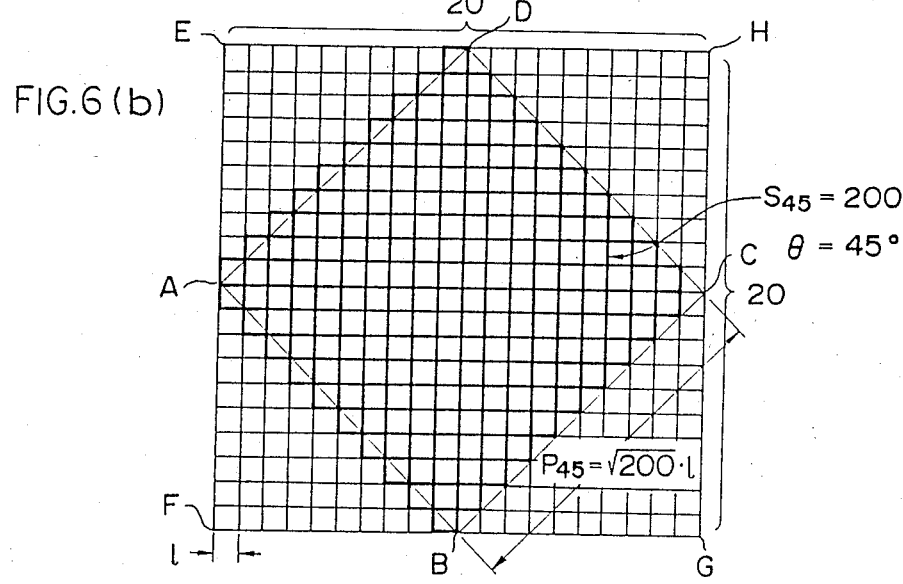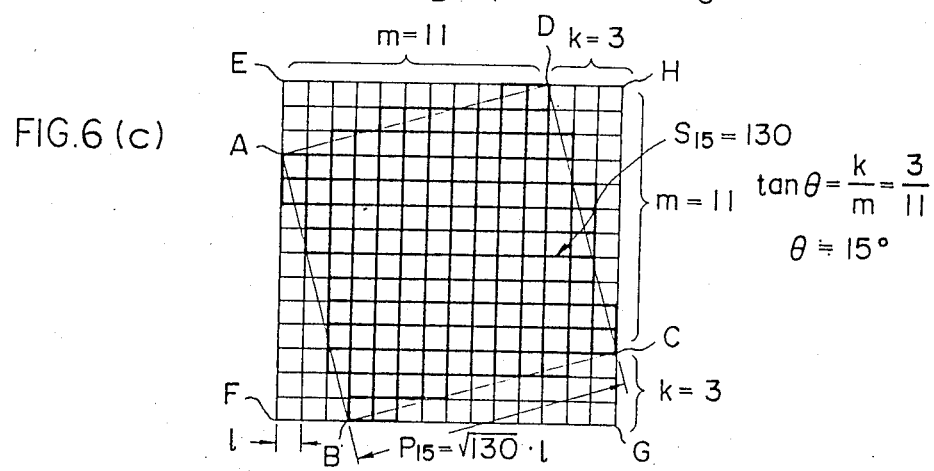

METHOD OF RECORDING A HALFTONE PICTURE ELECTRONICALLY

BACKGROUND OF THE INVENTION

The present invention relates to a method for recording a halftone picture electronically, for use in a halftone picture reproducing machine for plate making.

In a previously proposed picture reproducing machine which reproduces a halftone picture electronically and directly, in order to convert picture signals having a continuous gradation into recording signals for recording a halftone picture or a halftone plate, halftone signals equivalent to those obtained by scanning a halftone contact screen are additionally generated, and then the picture signals and the halftone signals are added consecutively to obtain the recording signals for recording the halftone plate.

Concerning such halftone signal generating means, a variety of means have been proposed, and ones using a solid memory are mainly employed lately due to the increase of the capactiy and the drop of the price of the solid memory.

However, when the solid memory is used, a halftone dot corresponding to a vignette halftone dot of a halftone contact screen is quantized and stored in it. Hence, the principal nature of the halftone structure composed by the halftone signals which are generated by the solid memory, is determined in advance depending on the conditions for properly performing the quantization of the vignette half-tone dot. Such conditions are, for instance, screen angles, density steps or gradation, factors of screen pitch, and so forth.

The screen angle $\theta$ should satisfy a condition: $\tan\theta = k/m$, wherein m and k are integers, when the vignette halftone dot is quantized. The density steps are determined depending on a number S of picture elements included in one vignette half-tone dot area, as hereinafter referred to as "a halftone dot area unit", and the maximum density steps are obtained as the picture element number $S = m^2 + k^2$.

The screen pitch P corresponds to a square root of the halftone dot area unit since the halftone structure comprises a repeat pattern of the square vignette halftone dot. Thus, in the halftone structure quantized, the square root of the total picture elements included in the halftone dot area unit, i.e. $\sqrt{S} = \sqrt{m^2 + k^2}$, is determined as a factor $\alpha$ of the screen pitch P.

Meanwhile, in the color printing, in general, the halftone plates for four colors are used a set of screen angles such as 0°, 45°, 15° and 75°, and their screen pitches P should necessarily be equal. However, when the vignette halftone dot is quantized, the proper conditions described above are given per each screen angle, and hence it is very difficult to determine the screen pitches P for all screen angles to become equal.

For example, when the condition $\tan\theta = k/m$ for obtaining the screen angle $\theta$ is determined as $$\tan 0 = \frac{0}{m_0}$$

when the screen angle is 0°, $$\tan 45 = \frac{m_{45}}{m_{45}}$$

when the screen angle is 45°, and $$\tan 15 = \frac{k_{15}}{m_{15}}$$

when the screen angle is 15°, respective picture element numbers $S_0$, $S_{45}$ and $S_{15}$ and factor $\alpha_0$, $\alpha_{45}$ and $\alpha_{15}$ for screen pitches are obtained as follows.

$$S_0 = m_0^2, \quad \alpha_0 = \sqrt{S_0} = m_0$$

$$S_{45} = 2m_{45}^2, \quad \alpha_{45} = \sqrt{S_{45}} = \sqrt{2}\, m_{45}$$

$$S_{15} = m_{15}^2 + k_{15}^2, \quad \alpha_{15} = \sqrt{S_{15}} = \sqrt{m_{15}^2 + k_{15}^2}$$

With reference to the screen angle of 75°, it can be considered as the screen angle of $-15°$.

Accordingly, it is apparent from the above description that it is impossible to coincide the factors $\alpha_0$, $\alpha_{45}$ and $\alpha_{15}$ for the respective screen pitches, which satisfy the proper conditions, even when $m_0$, $m_{45}$, $m_{15}$ and $k_{15}$ are selected from any integers. Hence, in practice, the integers are so selected to $m_0$, $m_{45}$, $m_{15}$ and $k_{15}$ that the picture element numbers $S_0$, $S_{45}$ and $S_{15}$ may be similar to one another, thereby obtaining similar factors $\alpha_0$, $\alpha_{45}$ and $\alpha_{15}$ of the screen pitches.

Actually, the screen pitch P is obtained by multiplying the factor $\alpha$ of the screen pitch to a real length l of one side of a picture element which is obtained when the quantized picture element is recorded on a photosensitive material, as $P = \alpha l$.

When the vignette halftone dot is quantized and stored in the solid memory and the halftone signals are generated, the periodicity of the repeat pattern of the halftone structure is utilized. The magnitude of this periodicity affects the capacity of the memory largely.

For example, the picture element number aligning in one period is expressed by using the integer values $m_0$, $m_{45}$, $m_{15}$ and $k_{15}$ when the screen angle is 0°, 45° or 15°, as described above, as $m_0$, $2m_{45}$ or $m_{15}^2 + k_{15}^2$. Then, it is readily understood that the picture element number for the screen angle of 15° is far larger than the others and thus the capacity of the memory becomes larger than the others.

Accordingly, the integer value $m_0$ is selected so that $m_{15}^2 + k_{15}^2$ may be small. However, since $m_{15}^2 + k_{15}^2$ corresponds to the picture element number $S_{15}$, if this value is determined to small, the number of the density steps is reduced.

However, the screen angles 0°, 15° and 75° are usually employed for the plates of yellow, magenta and cyan, and the number of the density steps or gradation for the yellow, magenta and cyan plates can be reduced as compared with that of a plate of black color using the screen angle of 45°.

Hence, the numbers of the density steps for the screen angles of 15° and $-15°$ are reduced compared with that required to the screen angle of 45°, thereby reducing the capacity of the memory. However, as described above, if the number of the density steps is varied, the picture element numbers S for the different screen angles can not approximate, with the result of the failure of the similarity of the factors $\alpha$ of the screen pitches.

SUMMARY OF THE INVENTION

It is an object of the present invention to provide a method for recording a halftone picture electronically, for use in a halftone picture reproducing machine for plate making, free from the aforementioned defects, which is capable of approximating actual screen pitches for different screen angles regardless of their picture element numbers of a quantized vignette halftone dot in order to prevent a halftone picture from causing moire, varying screen pitches for different screen angles without changing the scanning width, and determining the different picture element numbers for different screen angles per one period, and which can save the capacity of the memory.

According to the present invention there is provided a method for recording a halftone picture electronically, for use in a halftone picture reproducing machine for plate making, wherein a plurality of halftone data corresponding to a plurality of picture elements of a vignette halftone dot is simultaneously read out of a memory in which the vignette halftone dot quantized is stored, in synchronization with picture signals, and wherein the halftone data and the picture signals are added to obtain recording signals, and according to the recording signals a plurality of light beams for exposure are controlled to record a halftone picture, the improvement which comprises the steps of (a) selecting the number of the light beams included in a recording scanning width unit depending on a screen pitch, and (b) controlling the selected light beams according to the recording signals.

Further features, objects and advantages of the present invention will be clear from the following detailed description of a preferred embodiment thereof, in connection with the accompanying drawings.

BRIEF DESCRIPTION OF THE DRAWINGS

In the accompanying drawings:

FIGS. 6 (a)(b)(c) shows vignette halftone dots having different screen angles, which are quantized and stored in the screen pattern memory;

DESCRIPTION OF THE PREFERRED EMBODIMENT

Figure 1:
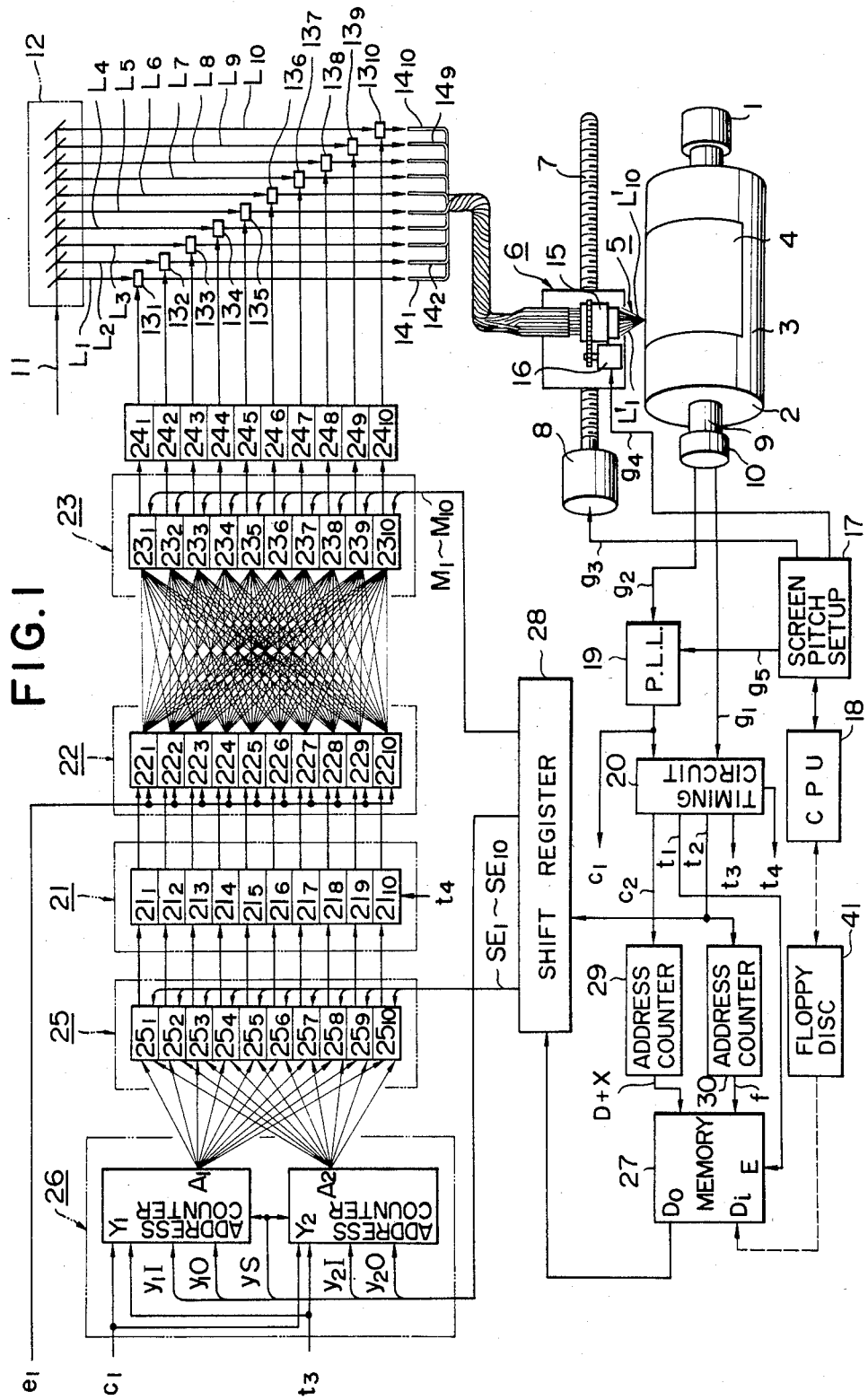
FIG. 1 is a block diagram of an electronic halftone picture reproducing machine which performs a method according to the present invention.

Referring to the drawings there is shown in FIG. 1 an electronic halftone picture reproducing machine for plate making, which performs a method according to the present invention.

A scanning means for recording a reproduction picture comprises a motor 1, a rotary cylinder 2 driven by the motor 1, having a peripheral surface 3 on which a photosensitive material 4 is mounted, an exposure light beam 5 projecting to the photosensitive material 4, a recording head 6 which is movable in the direction of the cylinder's axis, a screw rod 7 for moving the recording head 6, and a motor 8 which drives the screw rod 7.

A rotary encoder 10 which is rotatably mounted to a rotary shaft 9 of the cylinder 2, detects the rotation of the cylinder 2. The rotary encoder 10 generates not only a one-rotation pulse $g_1$ at the predetermined position but also a plurality of phase pulses $g_2$ at an equal interval per one rotation of the cylinder 2.

The recording head 6 outputs a row of exposure light beams 5 aligned in the direction of the cylinder's axis, and each light beam 5 is independently controlled into two values such as "ON" and "OFF". Such exposure light beams 5 can be produced by separating a ray of laser light beam 11 into a plurality (ten in this embodiment) of light beams $L_1$-$L_{10}$ having the same luminous energy by a beam splitter 12.

These light beams $L_1$-$L_{10}$ are input to shutter means $13_1$-$13_{10}$, respectively, and the shutter means $13_1$-$13_{10}$ output light beams $L_1'$-$L_{10}'$ being opened, to ten optical fibers $14_1$$14_{10}$, respectively. The optical fibers $14_1$$14_{10}$ are led to the recording head 6, and their free ends aligned in a row in the direction of the cylinder's axis in order of the light beams $L_1$-$L_{10}$ in front of the light input surface of a zoom lens 15 included in the recording head 6.

The light beams $L_1'$-$L_{10}'$ emitted from the free ends of the optical fibers $14_1$-$14_{10}$, incident upon the zoom lens 15, are focused onto the photosensitive material 4 by the zoom lens 15. The light beams $L_1'$-$L_{10}'$ focused are aligned in a row in the moving direction of the recording head 6 in order of their serial numbers.

The zoom lens 15 varies the projection magnification of the light beams $L_1'$-$L_{10}'$, while they are focused on the photosensitive material 4, i.e. a width w of real light beams focused of the light beams $L_1'$-$L_{10}'$. The zooming of the zoom lens 15 is controlled by a servomotor or a pulse motor 16 included in the recording head 6.

The servomotor 16 is controlled by a control signal $g_4$ which is generated by a screen pitch setup circuit 17, so as to control the projection magnification which is set up by selecting the number of the light beams $L_1'$-$L_{10}'$ per a scanning width W corresponding to a scanning line pitch or the moving length of the recording head 6 per one rotation of the cylinder 2 depending on a screen pitch P hereinafter mentioned.

On the other hand, an original picture (not shown) is scanned photoelectrically by an original picture scanning means (not shown) to obtain a picture signal $e_1$, in a conventional manner. When the reproduction scale is one, that is, the size of the reproduction picture is the same as that of the original picture, the scanning width W is set to the same as the scanning width or the scanning line pitch of the original picture scanning means, and the resolving power of the reproduction picture depends on the scanning width W of the recording scanning means.

In this embodiment, the picture signal $e_1$ may be a digital picture signal which is output from the original picture scanning means at the real time or which is read out of a memory storing the digital picture signals, in synchronization with the recording scanning means.

The servomotor or the pulse motor 16 so controls the projection magnification of the zoom lens 15 that an integral number n of the light beams $L_1'$, ... may be included in the scanning width W of the recording scanning means exactly. The control of the servomotor 16 is performed by the control signal $g_4$ which is obtained by calculation in a CPU (central processing unit) 18 depending on the desired screen pitch P set in the screen pitch setup means 17, the scanning width W previously determined, and the ingegral number n of the light beams $L_1'$, ...

The screen pitch setup means 17 outputs a control signal $g_3$ to the motor 8 so that the motor 8 may move the recording head 6 with the desired scanning width W, and a control signal $g_5$ to a P.L.L. (phase-lock loop) circuit 19, by which the P.L.L. circuit 19 produces a clock pulse $c_1$ having a period corresponding to the real beam width (w=W/n) depending on the number n of the output light beams $L_1'-L_{10}'$ included in the scanning width W.

The P.L.L. circuit 19 is provided with a programable counter whose count value is set up by the control signal $g_5$, and converts the phase pulse $g_2$ generated by the rotary encoder 10 into the clock pulse $c_1$ having a period $T_1$ corresponding to the setup count value of the programable counter.

Figure 2:
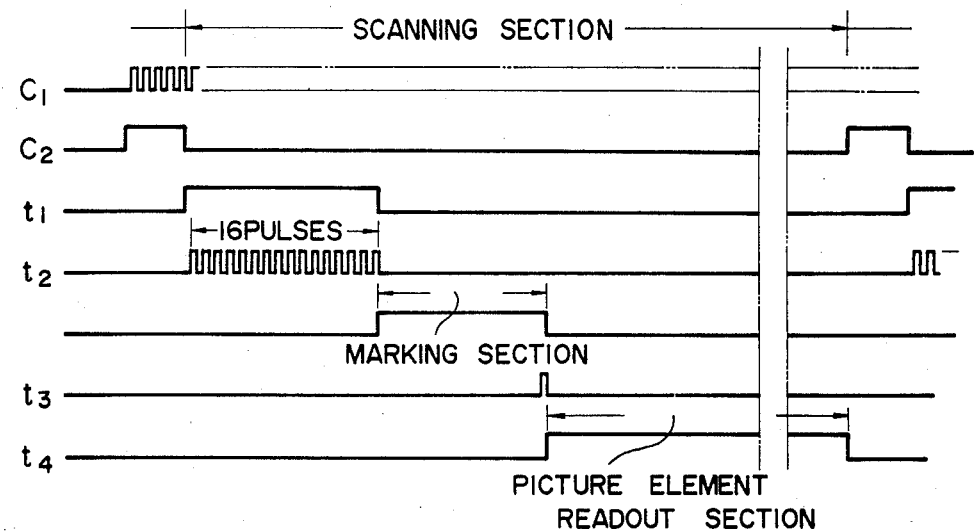
FIG. 2 shows a time chart of control pulses generated by a timing circuit of FIG. 1.

The clock pulse $c_1$ and the one-rotation pulse $g_1$ generated by the rotary encoder 10 are sent to a timing circuit 20, and the timing circuit 20 outputs control pulses $t_1-t_4$ shown in FIG. 2. The timing circuit 20 also performs the reformation of the one-rotation pulse $g_1$ and converts the reformed one-rotation pulse into a start pulse $c_2$ for the exact positioning in synchronization with the clock pulse $c_1$.

The clock pulse $c_1$ possesses the period $T_1$ corresponding to the distance equivalent to the real beam width w of the output light beams $L_1'-L_{10}'$ focused on the photosensitive material 4, as described above, and the real beam width w and the period $T_1$ correspond to the lengths l of the one sides of the picture element of the quantized vignette halftone dot in the directions of the cylinder's axis and the cylinder's periphery. One start pulse $c_2$ is generated at a standard position of the recording cylinder 2, which corresponds to the starting end of the exposure scanning of the photosensitive material 4.

In a screen pattern memory 21 comprising a plurality of memory blocks $21_1-21_{10}$ corresponding to a number N (ten in this embodiment) of the light beams $L_1-L_{10}$ which can be independently controlled to be on or off, as described above, halftone data representing a halftone structure of a halftone pattern and halftone densities to be converted into halftone dot area rates, corresponding to a plurality of scanning lines aligned adjacent to one another, is stored.

The screen pattern memory 21 may be composed of ROM (read only memory) of solid memory, or RAM (random access memory), and each of the memory blocks $21_1-21_{10}$ stores the halftone data for the desired screen angle such as 0°, 45°, 15° and 75°, in its address space.

The data read out of each of the memory blocks $21_1-21_{10}$ is a data of one word having the desired bit number corresponding to a density of the vignette halftone dot, by which a size of a halftone dot pattern or a halftone dot area rate is determined. The data read out of the memory blocks $21_1-21_{10}$ is fed to corresponding number of comparators $22_1-22_{10}$, respectively, which compose a pattern selector 22.

Each of the comparators $22_1-22_{10}$ compares the picture signal $e_1$ input thereto with the data input from the corresponding one of the memory blocks $21_1-21_{10}$, and outputs a two-value signal to multiplexers $23_1-23_{10}$ which compose a multiplex circuit 23. The multiplexers $23_1-23_{10}$ output signals to the corresponding number of shutter drivers $24_1-24_{10}$, respectively, so as to perform the open-close controls of the shutter means $13_1-13_{10}$, thereby selectively controlling the light beams $L_1-L_{10}$.

An address selector circuit 25 comprises selectors $25_1-25_{10}$, each having two input channels, corresponding to the memory blocks $21_1-21_{10}$. The selectors $25_1-25_{10}$ select one of two address signals input thereto to output the selected address signals to the corresponding memory blocks $21_1-21_{10}$, whereby addressing the memory blocks $21_1-21_{10}$.

The two address signals to be fed to the selectors $25_1-25_{10}$ are produced by first and second address counters $Y_1$ and $Y_2$ which compose an address signal generator 26. The two address counters $Y_1$ and $Y_2$ are initially preset immediately after the appearance of the start pulse $c_2$ so that they may have the desired difference of the count numbers.

The address selector circuit 25, the address signal generator 26, the screen pattern memory 21 and the multiplex circuit 23 are controlled every occurance of the start pulse $c_2$ by their control factors which are predetermined depending on the desired halftone structure, and the data for such control factors is stored in a screen control memory 27, as described hereinafter in detail.

In the screen control memory 27, words of control data for the control factors of the members 23, 25 and 26 are stored in series in one address in the desired order as a word of screen control data. The one of the screen control data having 16 bytes of length is divided into 16 parts, each corresponding to one byte (8 bits), and can be read out of the control memory 27 per one byte by addressing.

The one word of the screen control data which is read out each byte, is sent to a shift register 28 every byte consecutively. When the entire screen control data is read out of the memory 27, the words of the control data for the control factors of the members 23, 25 and 26 are stored in the desired positions of the shift register 28.

Figure 4:
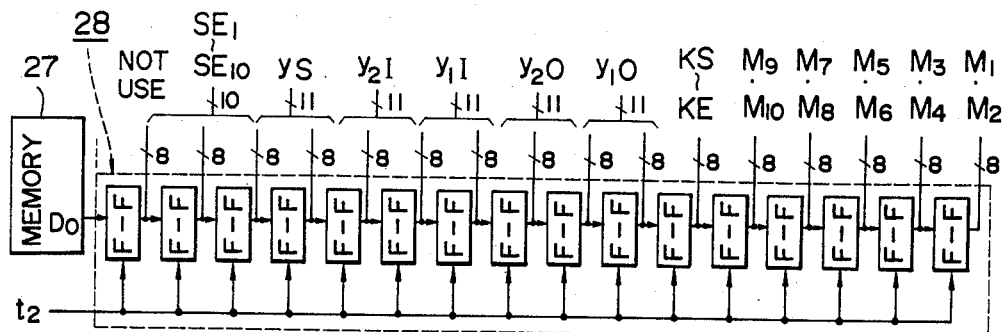
FIG. 4 is a block diagram of a shift register of FIG. 1.

The shift register 28 comprising 16 registers, each comprising 8 flip-flop circuits, as shown in FIG. 4, and the one word of the screen control data is output from the shift register 28, as one byte or eight bits, aligned in parallel, of data being output between the two adjacent registers per one byte. The output bit lines of the shift register 28 are connected to the control terminals of the multiplex circuit 23, the address selector circuit 25 and the address signal generator 26, and the control data as the control factors for these members 23, 25 and 26 are fed thereto through the output bit lines.

The address control of the screen control memory 27 is performed first and second address counters 29 and 30. The first address counter 29 addresses one address for the one word of the screen control data, and the second address counter 30 addresses one address for the one byte part divided of the one screen control data.

The second address counter 30 counts the control pulses $t_2$, and addresses every byte by the counted value f. The control pulse $t_2$ is produced by picking up 16 clock pulses $c_1$ in synchronizataion with the start pulse $c_2$ just after the appearance thereof. On this occasion, the control pulse $t_1$ which is obtained during the output of the control pulse $t_2$, enables the screen control memory 27 to be the readable condition.

The control pulse $t_2$ is also sent to the shift register 28, and stores the 8-bits data read out of the screen control memory 27 into the shift register 28 in synchronization with the read-out of the screen control memory 27 as well as it shifts the stored data to the lower bit positions one by one.

Figure 3:
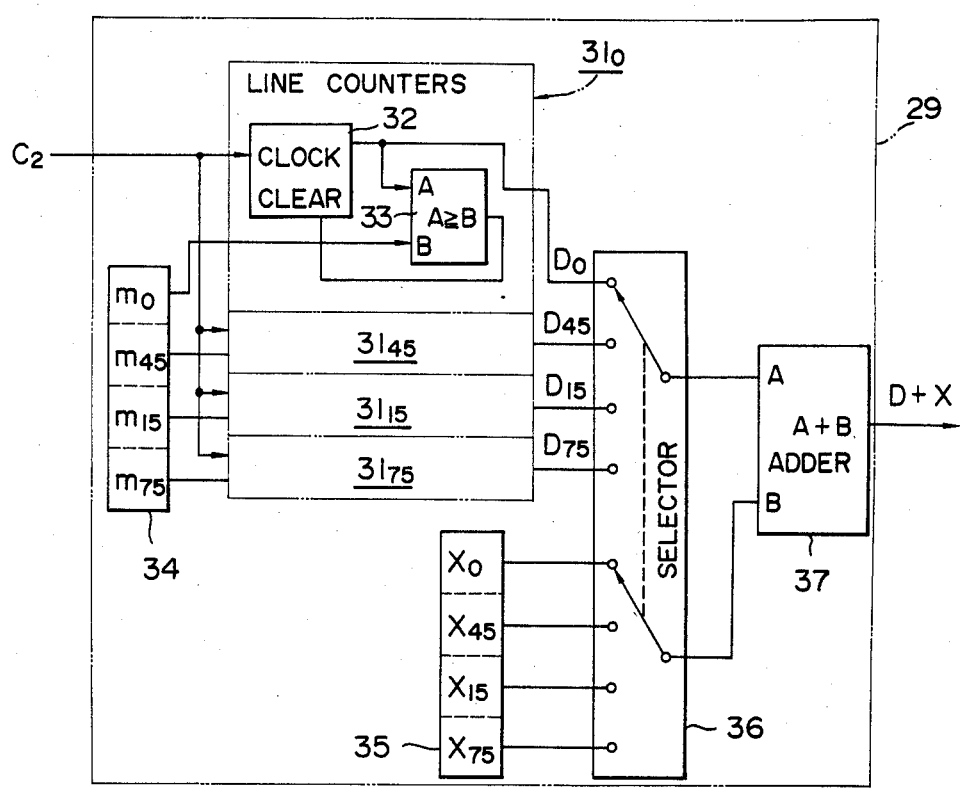
FIG. 3 is a block diagram of an address counter for a screen control memory of FIG. 1.

The first address counter 29 includes four line counters $31_0$, $31_{45}$, $31_{15}$ and $31_{75}$ for the screen angles of 0°, 45°, 15° and 75°, as shown in FIG.3. The four line counters possess the same construction, and thus one $31_0$ of them is shown in detail in FIG. 3. The line counter $31_0$ comprises a counter 32 and a comparator 33 which compose a programable base m counter. This base m counter counts the start pulses $c_2$, and the count number of the counter 32 so circulates that a comparative value $m_0$ of the comparator 33 may be a limit value.

The comparative values $m_0$, $m_{45}$, $m_{15}$ and $m_{75}$ of the line counters $31_0$, $31_{45}$, $31_{15}$ and $31_{75}$ are predetermined depending on the period of the repeat halftone pattern, as hereinafter described, and are fed from setup means 34.

The screen control data to be stored in the screen control memory 27 is alloted to divided address spaces each screen angle 0°, 45°, 15° or 75°, and the first addresses of the address spaces are given as offset values $X_0$, $X_{45}$, $X_{15}$ and $X_{75}$ corresponding to the respective screen angles of 0°, 45°, 15° and 75°. Such offset values $X_0$, $X_{45}$, $X_{15}$ and $X_{75}$ are set up in number setup means 35 every screen angle positions. When the desired screen angle is selected, the corresponding one of the offset values $X_0$, $X_{45}$, $X_{15}$ and $X_{75}$ and one of count values $D_0$, $D_{45}$, $D_{15}$ and $D_{75}$ of the line counters $31_0$, $31_{45}$, $31_{15}$ and $31_{75}$, which are selected by a cooperative selector 36, are sent to an adder 37.

The adder 37 adds the output value D of the line counter $31_0$, $31_{45}$, $31_{15}$ or $31_{75}$ and the offset value X of the setup means 35, and sends the added value $D+X$ to the screen control memory 27, by which one address for the one word of the screen control data is addressed therein.

The screen control data fed to the shift register 28 at the start end of the recording scanning in the direction of the cylinder's periphery by means of the start pulse $c_2$ is held during the recording scanning, and controls the generation of the halftone dot pattern of the recording scanning area.

As shown in FIG. 4, in the shift register 28 storing the one word of the screen control data as the end of the transferring direction of the shift register 28 being the lowermost bit, the lower 40 bits, the following 8 bits, the next upper 55 bits and the further upper 10 bits data are fed to the multiplex circuit 23, the shutter drivers 24 as mark codes, the address signal generator 26 and the address selector circuit 25, respectively. The remaining uppermost 15 bits are not used.

The 40 bits connecting the multiplex circuit 23 are divided into 10 words of control codes $M_1$-$M_{10}$, each comprising four bits, from the lowermost position. The 10 words of the control codes $M_1$-$M_{10}$ are input to the multiplexers $23_1$-$23_{10}$, respectively, and the binary codes of the control codes $M_1$-$M_{10}$, each can express one of the numbers 1-10 independently, select the outputs of the comparators $22_1$-$22_{10}$ corresponding to the expressed numbers.

Each of the 4-bit control codes $M_1$-$M_{10}$ can express 16 number of codes, i.e. six further numbers except 1-10, which do not select the comparators $22_1$-$22_{10}$. By using one of the other numbers of the codes except 1-10, the multiplexers $23_1$-$23_{10}$ can be controlled by selecting the other input signal means instead of the pattern selector 22 so that the output light beams $L_1$-$L_{10}$ may be controlled to be open or close in the same time regardless of the screen pattern.

The following upper 8 bits are employed as two words of 4-bit mark starting and mark ending codes KS and KE for recording marks such as scale lines at the scanning start and the scanning end positions.

The upper 10 bits connecting the address selector circuit 25 are divided into ten words of one-bit selecting codes $SE_1$-$SE_{10}$ from the lowermost position. The ten selecting codes $SE_1$-$SE_{10}$ are input to the corresponding selectors $25_1$-$25_{10}$, respectively, and select one of the outputs of the first and the second address counters $Y_1$ and $Y_2$ of the address signal generator 26.

Figure 5:
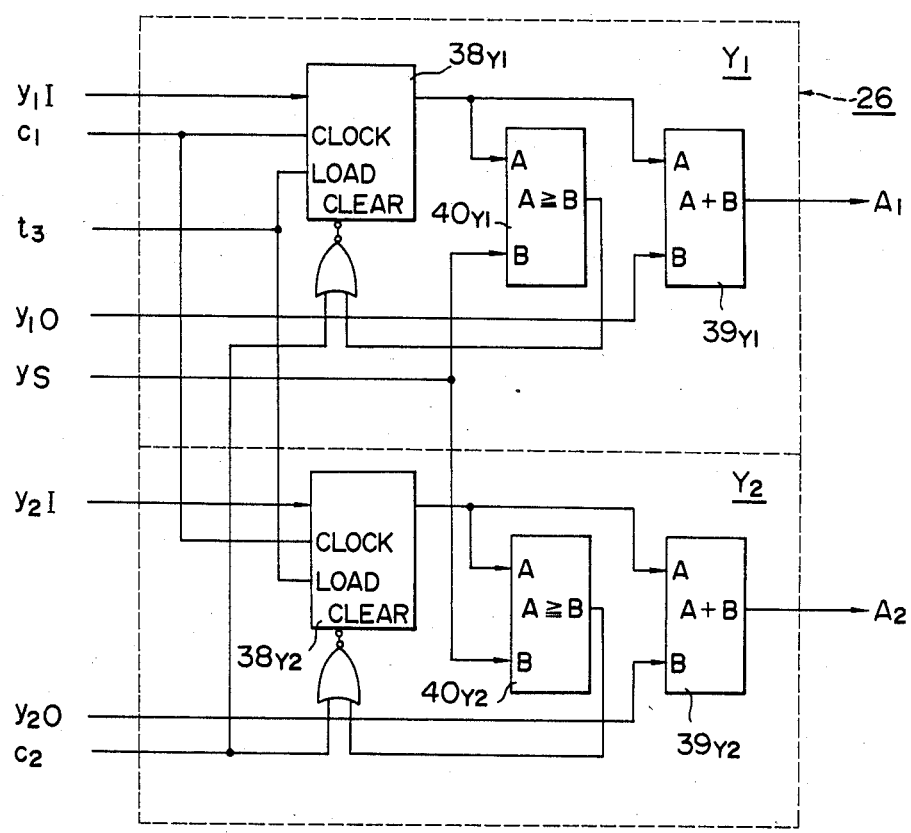
FIG. 5 is a block diagram of an address signal generator for a screen pattern memory of FIG. 1.

In FIG. 5 there is shown one embodiment of the address signal generator 26, and the 55 bits connecting to the address signal generator 26 are divided into 5 words of 11-bit codes from the lowermost position, such as an offset code $y_1O$ for the address counter $Y_1$, an offset code $y_2O$ for the address counter $Y_2$, an initial preset code $y_1I$ for the address counter $Y_1$, an initial preset code $y_2I$ for the address counter $Y_2$, and a circulation factor code $yS$ for the screen data.

The offset codes $y_1O$ and $y_2O$ to be sent to the first and the second address counters $Y_1$ and $Y_2$, respectively, express the initial addresses of the address spaces for the screen angles such as 0°, 45°, 15° and 75° in each of the memory blocks $21_1$-$21_{10}$, as the offset values, since the halftone data for the different screen angles are stored in the respective address spaces for the screen angles in each memory block. The offset codes $y_1O$ and $y_2O$ are sent to adders $39Y_1$ and $39Y_2$, respectively, in which they are added to counted values which are obtained by counting the clock pulses $c_1$ in respective counters $38Y_1$ and $38Y_2$ and are also fed to the respective adders $39Y_1$ and $39Y_2$.

The initial preset codes $y_1I$ and $y_2I$ correspond to the shift amounts of the addresses so that the halftone data of the discontinuous address numbers, stored in each memory block $21_1, \ldots$, or $21_{10}$, may be aligned in a row in the direction of the cylinder's periphery by shifting the addresses of the certain halftone data. The initial preset codes $y_1I$ and $y_2I$ are loaded into the respective counters $38Y_1$ and $38Y_2$ by the control pulse $t_3$ which is generated following on the control pulse $t_1$, as shown in FIG. 2.

The circulation factor code $yS$ is given per screen angle 0°, 45°, 15° or 75° corresponding to the picture element number included in one period depending on the predetermined periodicity of the halftone structure. The circulation factor code $yS$ is fed to comparators $40Y_1$ and $40Y_2$ and is compared with the counted values of the counters $38Y_1$ and $38Y_2$, which are also fed to the comparators $40Y_1$ and $40Y_2$, respectively. When the counted value of the counter $38Y_1$ is at least the same as the circulation factor code $yS$, the counter $38Y_1$ is cleared by the output of the comparator $40Y_1$, and thereby the adder $39Y_1$ circulating an address signal $A_1$ output by the first address counter $Y_1$. In the same manner, when the counted value of the counter $38Y_2$ is at least the same as the circulation factor code $yS$, the counter $38Y_2$ is cleared by the output of the comparator 40Y$_2$, and thereby the adder 39Y$_2$ circulating an address signal A$_2$ output by the second address counter Y$_2$.

The counters 38Y$_1$ and 38Y$_2$ are also cleared by the start pulse c$_2$. On this occasion, the timing of the count start of the counters 38Y$_1$ and 38Y$_2$ is ordered by the control pulse t$_3$ shown in FIG. 2, thereby outputting the added values y$_1$O+y$_1$I and y$_2$O+y$_2$I of the offset values y$_1$O and y$_2$O and the initial preset values y$_1$I and y$_2$I as the initial values of the address signals A$_1$ and A$_2$ on this start moment.

Thus, one of the obtained address signals A$_1$ and A$_2$ is selected by the address selector circuit 25 to control the memory blocks 21$_1$–21$_{10}$ of the screen pattern memory 21.

Then, the halftone data stored in the memory blocks will be described in the following.

In FIGS. 6(a), (b) and (c) there are shown vignette halftone dots having the screen angles 0°, 45° and 15°, which are quantized and stored in the screen pattern memory 21.

A square ABCD denotes one vignette halftone dot area or one halftone dot area unit, l denotes a real length of one side of a picture element, S$_0$, S$_{45}$ and S$_{15}$ denote numbers of the picture elements included in the halftone dot area units of the screen angles of 0°, 45° and 15°, and P$_0$, P$_{45}$ and P$_{15}$ denote screen pitches of the halftone dot area units.

Each screen pitch P$_0$, P$_{45}$ or P$_{15}$ is in proportion to a square root of the picture element number S$_0$, S$_{45}$ or S$_{15}$. Accordingly, in the halftone dot area units having the screen angles of 0°, 45° and 15°, shown in FIG. 6, the picture element numbers S$_0$, S$_{45}$ and S$_{15}$ are 169, 200 and 130, respectively, of different numbers, and when the length l of the one side of the picture element is determined to the same, their screen pitches P$_0$, P$_{45}$ and P$_{15}$ are different. Regarding the screen angle of 75°, it is symmetric to the screen angle of 15°, and hence it is very easy to understand its concept. Therefore, its explanation can be omitted.

Figure 7:
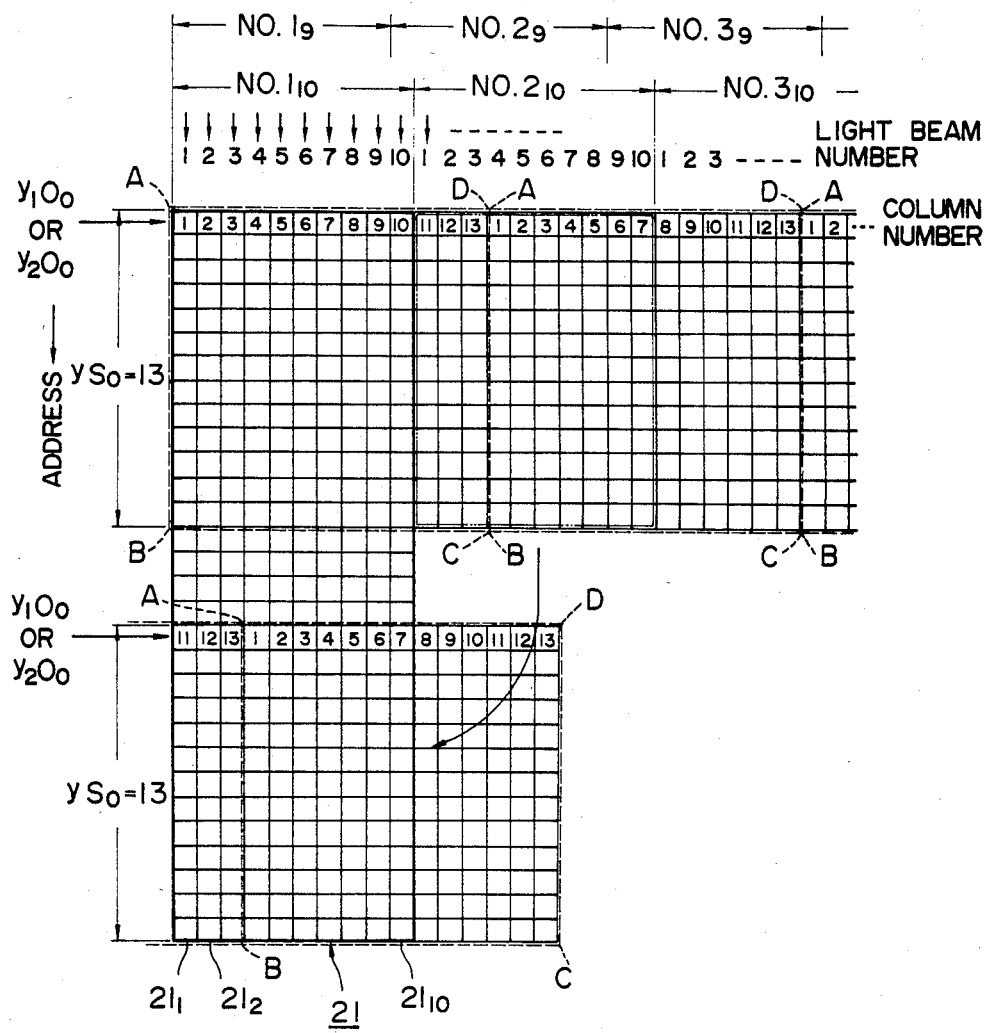
FIG. 7 is a memory map of halftone data of a quantized vignette halftone dot having a screen angle of 0°, stored in the screen pattern memory.

There is shown in FIG. 7 a memory map of the halftone data of the quantized vignette halftone dot having a screen angle of 0°, shown in FIG. 6(a), which is stored in the memory blocks 21$_1$–21$_{10}$ of the screen pattern memory 21.

A plurality of columns of halftone data are divided by the minimum repeat unit of the halftone pattern, and are stored into the address spaces for the screen angle of 0° of the memory blocks 21$_1$–21$_{10}$ corresponding to the column numbers.

For example, the first column of 13 picture elements including the one including the point A are consecutively stored in the address space for the screen angle of 0° of the first memory block 21$_1$ from the picture element including the point A in the address number order. Then, the second to the tenth columns of picture elements, aligned in parallel with the first column, are stored into the second to tenth memory blocks 21$_2$–21$_{10}$, respectively and continuously, in the same manner as the first column, thereby storing the first group of the picture elements comprising the ten columns of the picture elements with the same addresses into the memory blocks 21$_1$–21$_{10}$.

In this case, there are only ten memory blocks, and hence the eleventh to thirteenth columns of halftone data in the halftone dot area unit ABCD is still required. Then, assuming that one more halftone dot area unit ABCD positioned adjacent to the above described one ABCD apart from at a certain distance, ten columns of halftone data, the eleventh column being positioned as the first order corresponding to the first memory block 21$_1$, are stored in the memory blocks 21$_1$–21$_{10}$ in the same manner as the above description, thereby storing the second group of the picture elements comprising the ten columns of the picture elements with the same addresses into the memory blocks 21$_1$–21$_{10}$.

In each memory block 21$_1$, ..., or 21$_{10}$, two groups of the halftone data, aligned in a column at a certain distance away from each other, is stored cosecutively by addressing from the first and the second initial addresses. These first and the second initial addresses correspond to the offset codes y$_1$O and y$_2$O to be given to the address counters Y$_1$ and Y$_2$ respectively. The number (13 in this embodiment) of the picture elements of one group, aligned in a column continuously, corresponds to the circulation factor code yS$_0$.

Figure 8:
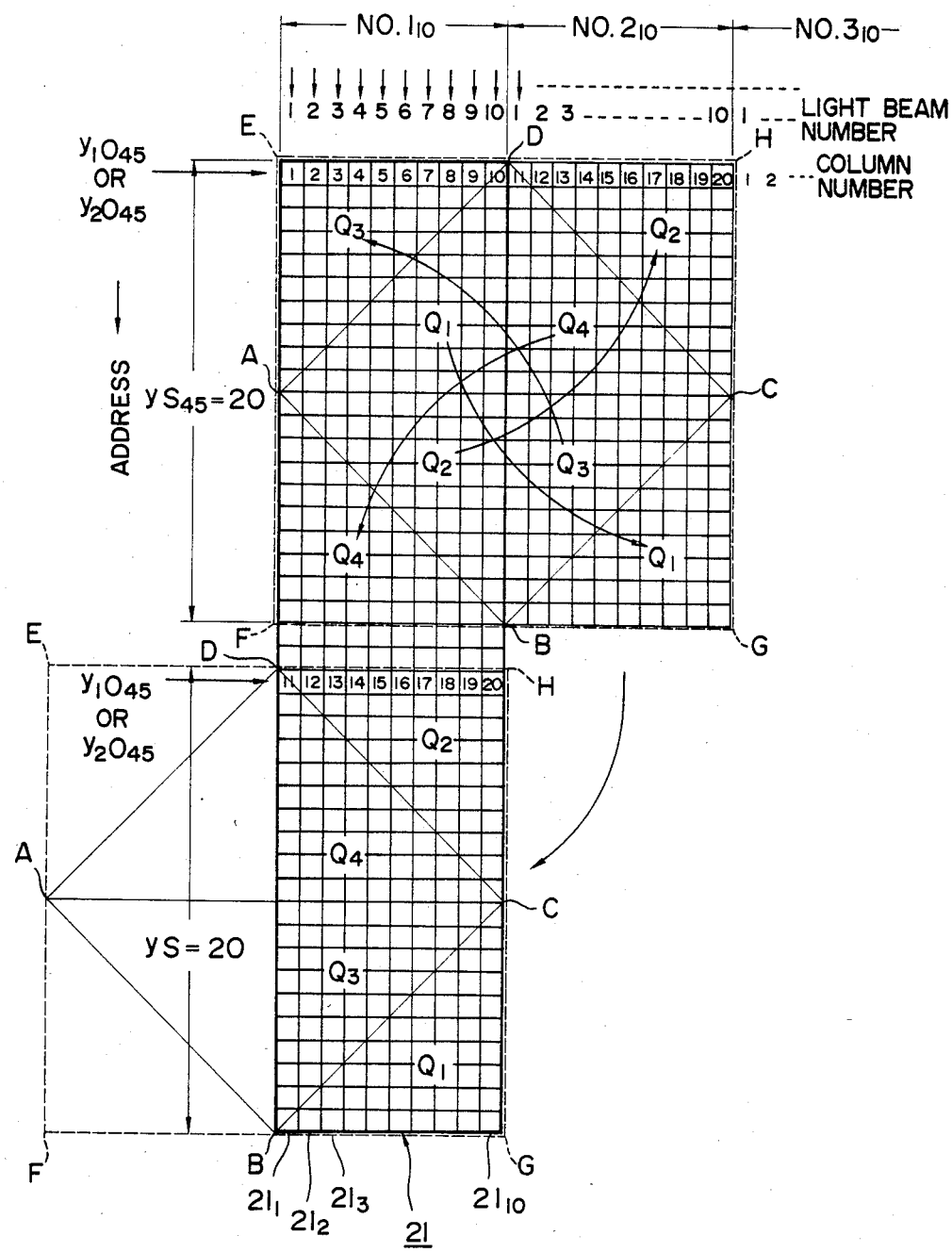
FIG. 8 is a memory map of a quantized vignette halftone dot having a screen angle of 45°, alike FIG. 7.

In FIG. 8 there is shown a memory map of the halftone data of the quantized vignette halftone dot having a screen angle of 45°, as shown in FIG. 6(b), which is stored in the memory blocks 21$_1$–21$_{10}$ of the screen pattern memory 21.

When the screen angle is not 0°, the sides of the halftone dot area unit ABCD do not extend in parallel with the directions of cylinder's periphery and cylinder's axis, and thus a circumscribed square EFGH on the halftone dot area unit ABCD, whose four sides extend in parallel with the directions of cylinder's periphery and cylinder's axis, is assumed, and is quantized into the picture elements, resulting in quantizing the inscribed halftone dot area unit to a mosaic pattern.

This circumscribed square EFGH includes double halftone data as the vignette halftone dot or the halftone dot area unit, and four triangles Q$_1$, Q$_2$, Q$_3$ and Q$_4$ which are obtained by cutting away the inscribed square ABCD by its diagonal lines $\overline{AC}$ and $\overline{BD}$, have relation with four triangles Q$_1$, Q$_2$, Q$_3$ and Q$_4$ which are obtained by cutting away the circumscribed square EFGH by the four sides of the inscribed square ABCD and are positioned in its four corners so that the former four triangles may be overlapped to the latter four triangles by transferring the former in the directions of the screen lines, in parallel.

A plurality columns of halftone data aligned in the direction of the cylinder's periphery are divided by 20 picture elements of the repeat period, which are included in one side of the circumscribed square EFGH. Ten columns of the first half halftone data of the circumscribed square EFGH, each column consisting of 20 halftone data, is stored into the address spaces for the screen angle of 45° of the memory blocks 21$_1$–21$_{10}$ as the first group of the halftone data in order of the column number by addressing from the first address of the address spaces. Then, ten columns of the latter half halftone data of the circumscribed square EFGH is stored into the memory blocks 21$_1$–21$_{10}$ as the second group of the halftone data by addressing from the second initial address of the address spaces, in the same manner as the first half halftone data described above.

The first and the second initial addresses of the first and the second groups of the halftone data correspond to the offset codes y$_1$O$_{45}$ and y$_2$O$_{45}$ for the screen angle of 45°, and the number of the picture elements aligned in one column of one group corresponds to the circulation factor code.

When the screen angle is 0° and 45°, since no halftone data is read out from the intermediate address of the repeat period at the starting, the initial preset codes $y_1I_0$, $y_2I_0$, $y_1I_{45}$ and $y_2I_{45}$ to be sent to the address counters $Y_1$ and $Y_2$ are always set to "1" so as to address the first address.

When the screen angle is 45°, as shown in FIG. 6(b), the halftone data for the halftone dot area unit can be obtained from the first group of the halftone data. That is, since the number of the memory blocks $21_1$–$21_{10}$ is half number of the 20 picture elements included in one side of the circumscribed square EFGH, the first group includes the entire halftone data for one vignette halftone dot, and the same data having the addresses as those of the second group can be obtained by shifting the starting addresses by using the initial preset codes $y_1I_{45}$ and $y_2I_{45}$. In such a case, the initial preset codes $y_1I_{45}$ and $y_2I_{45}$ are determined to the number of the picture elements aligned from the picture element including the point E to the picture element including the point A.

Figure 9:
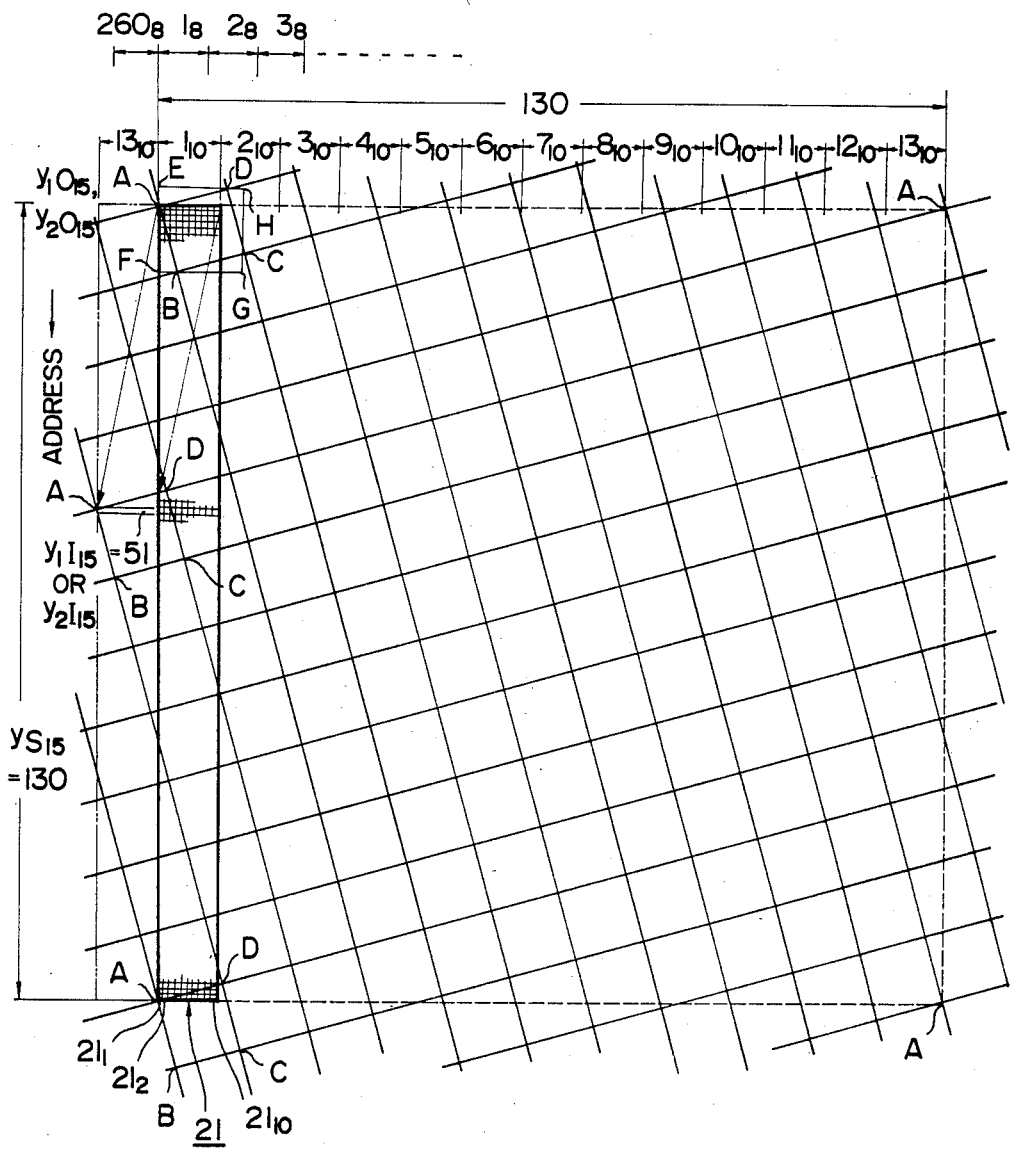
FIG. 9 is a memory map of a quantized vignette halftone dot having a screen angle of 15°, alike FIG. 7.
Figure 10:
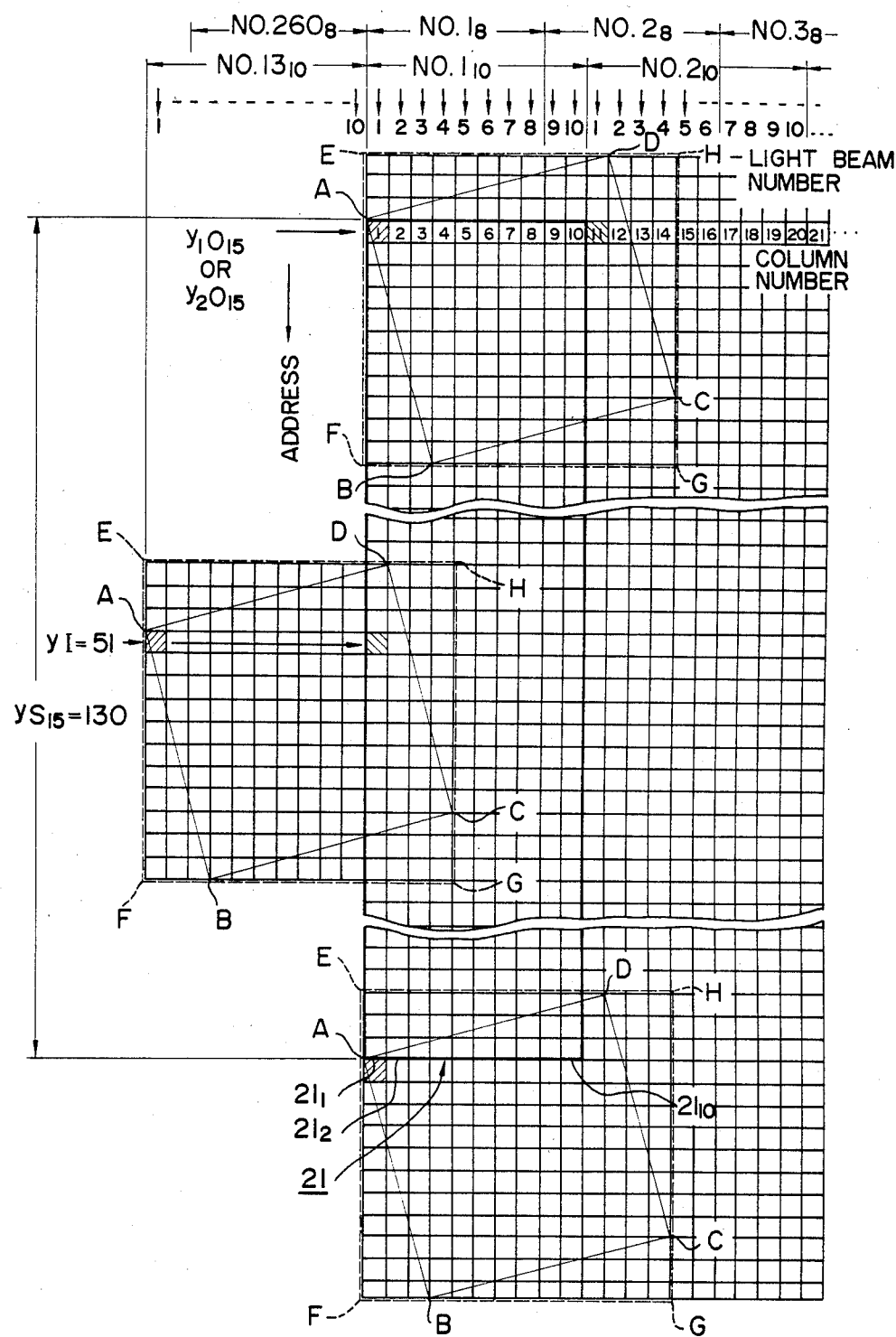
FIG. 10 is an enlarged memory map of an essential part of FIG. 9.

In FIGS. 9 and 10 there is shown a memory map of the halftone data of the quantized vignette halftone dot having the screen angle of 15°, as shown in FIG. 6(c), which is stored in the memory blocks $21_1$–$21_{10}$ of the screen pattern memory 21. In FIG. 9 ten columns of halftone data of one minimum repeat period in the column direction is shown, and in FIG. 10 its essential part enlarged is shown.

In this embodiment, as shown in FIG. 6(c), a circumscribed square EFGH on the vignette halftone dot ABCD is assumed, in the same manner as the embodiment of the screen angle of 45°, as described above. Then, the circumscribed square EFGH is quantized by the picture elements, thereby quantizing the inscribed square ABCD to a mosaic pattern, in the same manner as the embodiment of the screen angle of 45°.

In this case, the four sides of the circumscribed square EFGH are divided at a ratio m to k equals 11 to 3 by the four vertices A, B, C and D of the inscribed halftone dot area unit ABCD, and this ratio corresponds to $\tan\theta = k/m$, wherein k and m mean integers, by which the screen angle $\theta$ is determined.

The minimum repeat unit of the quantized halftone structure having the screen angle $\theta$ whose tangent value $\tan\theta$ equals k/m, includes $m^2+k^2$ number of picture elements in the row and the column directions respectively.

In this embodiment, the circumscribed square EFGH includes 14 number of picture elements in the row and the column directions respectively, and $m^2+k^2$ of the side of the minimum repeat square unit is $11^2+3^2=130$.

The first ten columns of the halftone data, each column including 130 picture elements in the direction of the cylinder's periphery, of the minimum repeat unit of the quantized halftone structure including $(m^2+k^2)^2$ number of picture elements, are stored into the address spaces for the screen angle of 15° of the memory blocks $21_1$–$21_{10}$ as the first group of the halftone data in order of the column number by addressing, in the same manner as the embodiment of the screen angle of 45° described above.

In this embodiment of the screen angle of 15°, it is unnecessary to store the remaining groups of the halftone data (from the eleventh to the hundred-and-thirtieth columns of the halftone data) of the minimum repeat unit of the quantized halftone structure into the memory blocks $21_1$–$21_{10}$, which prevents the address spaces from increasing.

The remaining eleventh to hundred-and-thirtieth columns of the halftone data can be obtained in the followings.

In the memory blocks $21_1$–$21_{10}$ the first ten columns of halftone data is stored with the addresses 1–130 in the column direction, and when the address signals are circulated, the first row of ten halftone data follows up the 130th row of ten halftone data.

The first row (the eleventh to twentieth columns) of the second group of the halftone data of the minimum repeat unit of the quantized halftone structure is stored in the 51th address of the first group of the halftone data stored in the memory blocks $21_1$–$21_{10}$, as clearly shown in FIG. 10.

Therefore, the second group of the halftone data can be obtained by reading out the halftone data stored in the memory blocks $21_1$–$21_{10}$ by addressing from the 51th address to the 50th address, while the addresses are circulated from the 130th address to the first address. This process is carried out by feeding the address number 51 to the address counter $Y_1$ and $Y_2$ as the initial preset codes $y_1I_{15}$ and $y_2I_{15}$. The remaining third to thirteenth groups of the halftone data can be obtained in the same manner as described above.

The address spaces for the screen angle of 15° in the memory blocks $21_1$–$21_{10}$ are selected by the offset codes and $y_1O_{15}$ and $y_2O_{15}$ which express the initial addresses of the address spaces for the screen angle of 15°. The circulation factor code yS is determined to 130, as described above.

In the memory blocks $21_1$–$21_{10}$ storing the halftone data, as described above, the offset codes change the address spaces for the different screen angles, and the initial preset codes address the first picture elements read out of the memory blocks circulatorily.

The offset codes can be used for addressing the first and the second groups of the halftone data separately, as well as changing the address spaces for the different screen angles.

For example, when the screen angle is 0°, as shown in FIG. 7, in case of ten output light beams, the first group of picture elements are addressed in the first scanning section NO. $1_{10}$ and the second group of picture elements are addressed in the second scanning section NO. $2_{10}$ in order of the memory blocks $21_1$–$21_{10}$. In this case, the aligning order of the picture elements in the row direction corresponds to that of the output light beams $L_1'$–$L_{10}'$.

However, in the third scanning section NO. $3_{10}$, 8–10 columns of the first group and 1–7 columns of the second group should be addressed in order to obtain 8th–13th and 1st–4th columns of halftone data. In this case, the offset code $y_1O_0$ for addressing the initial address of the first group is given to the address counter $Y_1$ and the offset code $y_2O_0$ for addressing the initial address of the second group is given to the address counter $Y_2$. The selecting codes $SE_8$–$SE_{10}$ to be fed to the selectors $25_8$–$25_{10}$ are determined so that the address signal $A_1$ output from the address counter $Y_1$ may be fed to the memory blocks $21_8$–$21_{10}$, and the selecting codes $SE_1$–$SE_7$ to be fed to the selectors $25_1$–$25_7$ are determined so that the address signal $A_2$ output from the address counter $Y_2$ may be fed to the memory blocks $21_1$–$21_{10}$.

In this case, however, the row of halftone data read out of the memory blocks $21_1$–$21_{10}$ does not correspond to the light beams $L_1$–$L_{10}$, and then in order to rearrange the order of the data read out of the memory blocks $21_1$–$21_{10}$, the control codes $M_1$–$M_{10}$ to be input to the multiplexers $23_1$–$23_{10}$ are determined so that the multiplexers $23_1$–$23_{10}$ may select the outputs of the comparators $22_8$, $22_9$, $22_{10}$, $22_1$, $22_2$, ..., and $22_7$, respectively, thereby connecting the outputs of the memory blocks $21_1$–$21_{10}$ to the light beams $L_1$–$L_{10}$ in the desired order.

This control of the connection between the comparators $22_1$–$22_{10}$ and the multiplexers $23_1$–$23_{10}$ can be performed, as occasion demands, when the screen angle is changed to the others such as 45°, 15° and −15°.

When the recording is carried out by using ten light beams for all screen angles, as shown in FIG. 6, the screen pitches are different each screen angle.

The variation of the screen pitch P of the halftone structure for the different screen angles depending on the picture element number S of the halftone structure, the scanning width W, and numbers n of the light beams included in the scanning width W is obtained according to the following formula (1), and the result is tabulated in the following table.

$$P = \frac{\sqrt{s}}{n} \cdot W \qquad (1)$$

sponding relation between the arrangement of the picture elements in the direction of cylinder's axis and the light beams $L_1$–$L_{10}$.

This repeat number corresponds to the comparative value $m_0$ set up in the first address counter 29 for the screen control memory 27.

When the number n of the light beams used is 9, the least common multiple of 9 and 13 is 117 which is the number of the repeat picture elements, and $117/9 = 13$ means the number of the repeat scanning times, i.e. $m_0 = 13$.

This repeat scanning number means the number R of the picture elements included in the repeat period of the halftone structure regardless of the screen angle, and from the repeat scanning number R and the number n of the picture elements actually used the least common multiple m is obtained. The value m/n corresponds to the word number of the screen control data.

Since the contents of the screen control data is varied by varying the number n of the used light beams, the screen control data is prepared depending on the different screen angles θ and the numbers n of the different used light beams and is stored in advance in a recording medium such as a floppy disc 41, and so forth. Such screen control data is loaded to the screen control memory 27 by means of the CPU 18 prior to the start of the processing.

| Screen Angle | k/m | S | $\sqrt{s}$ | n = 1 | n = 2 | n = 3 | n = 4 | n = 5 | Factor of Screen Pitch: $\sqrt{s}/n$ n = 6 | n = 7 | n = 8 | n = 9 | n = 10 |
|---|---|---|---|---|---|---|---|---|---|---|---|---|---|
| 0° | 0/13 | 169 | 13 | 13 | 6.50 | 4.33 | 3.25 | 2.60 | 2.17 | 1.86 | 1.63 | 1.44 | 1.30 |
| 45° | 10/10 | 200 | 14.1 | 14.1 | 7.07 | 4.71 | 3.54 | 3.23 | 2.36 | 2.02 | 1.77 | 1.57 | 1.41 |
| ±15° | 3/11 | 130 | 11.4 | 11.4 | 5.70 | 3.80 | 2.85 | 2.28 | 1.90 | 1.63 | 1.43 | 1.27 | 1.14 |

It is readily understood that by varying the number n of the light beams the adjustment of the screen pitches for different screen angles can be performed so that they may be approximate values, and the screen pitches can be varied while they are kept to be approximate values.

For example, when nine, ten and eight light beams are used for the screen angles of 0°, 45° and ±15°, respectively, the screen pitches for the screen angles of 0°, 45°, 15° and 75° are obtained as $P_0 = 1.44 \cdot W$, $P_{45} = 1.41 \cdot W$, $P_{15} = 1.43 \cdot W$ and $P_{75} = 1.43 \cdot W$. The other screen pitches can be obtained from the numbers n of the light beams for the different screen angles of which the factors $\sqrt{s}/n$ of the screen pitch are approximate, as in the table.

As described above, when the number n of the light beams is varied, the number N of the row of picture elements read out of the screen pattern memory 21 differs from the number n of the row of picture elements actually used, and thus the periodicity in the direction of cylinder's axis varies depending on the number n of the light beams used.

For example, when the screen angle is 0°, as shown in FIG. 7, in case of N = 10 and n = 10, the halftone structure composed of the halftone dot area units, each comprising 13 columns of picture elements, is recorded every 10 columns, and hence the repeat period becomes the least common multiple of 130. Accordingly, since 130 picture elements are read out every 10 number by 10 light beams, the first condition is returned by 13 repeats. This means that after the 13th scanning section NO. $13_{10}$, the same scanning section as the first scanning section NO. $1_{10}$ appears, that is, 13 words are required of the screen control data for controlling the corre- It is readily understood from the above description that according to the present invention the number n of the output light beams $L_1$–$L_{10}$ included in the scanning width W can be optionally determined, and thereby the screen pitch P of the halftone picture can be selected in many ways without changing the scanning width W.

Since the screen pitch P can be varied freely without changing the scanning width W which is fixed, the numbers n of the picture elements of the quantized vignette halftone dots for the screen angles of 0°, 45°, 15° and 75°, which are to be stored in the solid memory, can be also different other than the approximate numbers similar to the same numbers, and therefore the selectivity of the picture elements included in the vignette halftone dot to be quantized can be increased largely.

Further, since the number of the picture elements included in the quantized vignette halftone dot can be varied each screen angle, the capacity of the used solid memory can be reduced by differing the reproduction density range of the black plate from those of the color plates.

Although the present invention has been described in some details by way of illustration and example for purposes of clarity of understanding, it will, of course, be understood that various changes and modifications may be made in the form, details, and arrangments of the parts without departing from the scope of the present invention.

What is claimed is:

1. A method for recording a halftone picture electronically, for use in a halftone picture reproducing machine for plate making, wherein a plurality of halftone data corresponding to a plurality of picture elements of a vignette halftone dot is simultaneously read out of a memory in which the vignette halftone dot quantized is stored, in synchronization with picture signals, and wherein the halftone data and the picture signals are added to obtain recording signals, and according to the recording signals a plurality of light beams for exposure are controlled to record a halftone picture, the improvement which comprises the steps of:

(a) selecting the number of the light beams included in a recording scanning width depending on a screen pitch; and
(b) controlling the selected light beams according to the recording signals.

2. A method as defined in claim 1, wherein the screen angle of the vignette halftone dot is selected to 0°, 45°, 15° or 75°.

* * * * *